(12) United States Patent
Vincent et al.

(10) Patent No.: US 7,705,070 B2
(45) Date of Patent: Apr. 27, 2010

(54) INK-JET COMPATIBLE LATEXES

(75) Inventors: Kent D. Vincent, Palo Alto, CA (US); Sivapackia Ganapathiappan, Palo Alto, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 349 days.

(21) Appl. No.: 11/486,488

(22) Filed: Jul. 14, 2006

(65) Prior Publication Data

US 2006/0258777 A1 Nov. 16, 2006

Related U.S. Application Data (63) Continuation-in-part of application No. 10/360,472, filed on Feb. 6, 2003, now Pat. No. 7,119,133, and a continuation-in-part of application No. 10/360,473, filed on Feb. 6, 2003, now Pat. No. 7,402,617.

(51) Int. Cl.
*C09D 11/00* (2006.01)
*G01D 11/00* (2006.01)
*C08L 33/06* (2006.01)
*C08F 297/02* (2006.01)

(52) U.S. Cl. .................. 523/160; 523/161; 347/100; 524/560; 524/556; 524/570

(58) Field of Classification Search .................. 523/160, 523/161, 200, 205, 201; 524/556, 560, 577
See application file for complete search history.

(56) References Cited

U.S. PATENT DOCUMENTS

| | | | |
|---|---|---|---|
| 3,615,469 A | 10/1971 | Ramp | |
| 4,078,493 A | 3/1978 | Miyamoto | |
| 4,665,107 A | 5/1987 | Micale | |
| 4,808,443 A * | 2/1989 | Minamoto et al. | 427/407.1 |
| 5,554,739 A | 9/1996 | Belmont | |
| 5,786,420 A | 7/1998 | Grandhee | |
| 5,814,685 A | 9/1998 | Satake et al. | |
| 5,852,073 A * | 12/1998 | Villiger et al. | 523/161 |
| 5,922,118 A * | 7/1999 | Johnson et al. | 106/31.6 |
| 5,954,866 A | 9/1999 | Ohta et al. | |
| 5,977,210 A * | 11/1999 | Patel et al. | 523/161 |
| 5,990,202 A | 11/1999 | Nguyen et al. | |
| 6,057,384 A | 5/2000 | Nguyen et al. | |
| 6,248,805 B1 | 6/2001 | Nguyen et al. | |
| 6,277,437 B1 | 8/2001 | Helmer et al. | |
| 6,417,249 B1 | 7/2002 | Nguyen et al. | |
| 6,767,090 B2 * | 7/2004 | Yatake et al. | 347/100 |
| 2002/0025994 A1 | 2/2002 | Ishizuka et al. | |
| 2002/0077383 A1 * | 6/2002 | Takao et al. | 523/160 |
| 2003/0029355 A1 | 2/2003 | Miyabayashi | |
| 2003/0044626 A1 | 3/2003 | Kim et al. | |
| 2003/0050362 A1 | 3/2003 | Sakai et al. | |
| 2003/0195274 A1 | 10/2003 | Nakamura et al. | |
| 2003/0225185 A1 | 12/2003 | Akers, Jr. et al. | |
| 2004/0063808 A1 | 4/2004 | Ma et al. | |
| 2004/0066440 A1 | 4/2004 | Ungefug et al. | |
| 2004/0112525 A1 | 6/2004 | Pereira et al. | |
| 2004/0116596 A1 | 6/2004 | Vincent et al. | |
| 2004/0127639 A1 | 7/2004 | Wang et al. | |
| 2004/0131855 A1 | 7/2004 | Ganapathiappan | |
| 2004/0157956 A1 * | 8/2004 | Vincent et al. | 523/160 |
| 2004/0157957 A1 * | 8/2004 | Ganapathiappan et al. | 523/160 |
| 2004/0197531 A1 | 10/2004 | Vincent et al. | |

FOREIGN PATENT DOCUMENTS

| | | |
|---|---|---|
| EP | 1 088 865 | 4/2001 |
| EP | 1 245 652 | 10/2002 |
| EP | 1 270 681 | 1/2003 |
| EP | 1 300 422 | 4/2003 |
| EP | 1 300 422 A | 4/2003 |
| EP | 1 698 674 A | 9/2006 |
| WO | WO2001094482 | * 12/2001 |
| WO | 2005/095531 A | 10/2005 |

OTHER PUBLICATIONS

Wisniak et al "Volumetric Properties of the Ternary system 1,4-Dioxane + Butyl Acrylate + Ethyl Acrylate and it Binary Butyl Acrylate + Ethyl acrylate at 298.15K", Journal of Solution Chemistyr, vol. 34, No. 2, Vebruary 2005, pp. 171-183.*

Polymer Data Handbook 1999 Oxford University Press, Inc., pp. 829-836.*

Davies et al, "Surface Chemical Characterization Using XPS and Tof-SIMS of Latex Particles Prepared by the Emulsion Copolymerization of Methacrylic Acid and Styrene", Langmuir vol. 12 Issue 16, pp. 3866-3875 (1996).*

Bicerano, Jozef, "Prediction of Polymer Properties," 1996, pp. 244-249.

* cited by examiner

*Primary Examiner*—Vasu Jagannathan
*Assistant Examiner*—Alexander C Kollias (57) ABSTRACT

The present invention is directed to latex particulates having a greater concentration of acid at their surfaces than at their cores. A method of making such particulates can comprise copolymerizing an acidic monomer with a non-acidic monomer so as to yield a copolymer chain having more acidic monomer at one end than at the other.

43 Claims, 2 Drawing Sheets

INK-JET COMPATIBLE LATEXES

The present application is a continuation-in-part of U.S. application Ser. No. 10/360,472, filed on Feb. 6, 2003, now U.S. Pat. No. 7,119,133, as well as a continuation-in-part of U.S. application Ser. No. 10/360,473, filed on Feb. 6, 2003, now U.S. Pat. No. 7,402,617, each of which is incorporated herein by reference in its entirety.

BACKGROUND OF THE INVENTION

The majority of inks and toners used in the printing industry employ water insoluble polymers for print adhesion and durability. Water-based inks, such as used in ink-jet printing, can incorporate water insoluble polymer as dispersed particulates. The particulates are typically designed with a glass transition temperature ($T_g$) near room temperature to allow formation of a print-film on the printed substrate under normal ambient conditions.

The thermal ink-jet printing process presents a significant challenge to polymer particle-based inks since the ink is jetted under high fluidic shear at temperatures that are significantly above the $T_g$ of the particle. Thermal ink-jet printing is rather unique in requiring a polymer solid to operate above its $T_g$. Conversely, most other polymer solid applications typically only require performance below the $T_g$ of the solid. Under the elevated temperature conditions of a thermal ink-jet pen, conventional polymer particles produce severely degraded print and pen performance. This degradation typically includes reduced jet drop velocity, drop weight and attainable drop frequency (print speed), and clogged pen nozzles and ink channels. Thus, there exists a need, therefore, for polymer particles for use in ink-jet inks that provide improved print performance at elevated temperatures such as are produced by thermal ink-jet pens.

BRIEF DESCRIPTION OF THE DRAWINGS

Additional features and advantages of the invention will be apparent from the detailed description which follows, taken in conjunction with the accompanying drawings, which together illustrate, by way of example, features of the invention; and, wherein.

DETAILED DESCRIPTION OF THE PREFERRED EMBODIMENT(S)

Before the present invention is disclosed and described, it is to be understood that this invention is not limited to the particular process steps and materials disclosed herein because such process steps and materials may vary somewhat. It is also to be understood that the terminology used herein is used for the purpose of describing particular embodiments only. The terms are not intended to be limiting because the scope of the present invention is intended to be limited only by the appended claims and equivalents thereof.

It must be noted that, as used in this specification and the appended claims, the singular forms "a," "an," and "the" include plural referents unless the context clearly dictates otherwise.

As used herein, "liquid vehicle" or "ink vehicle" refers to the fluid in which colorants and/or latex particulates or colloids are dispersed to form ink-jet inks and latexes in accordance with the present invention. Many liquid vehicles and vehicle components are known in the art. Typical ink vehicles can include a mixture of a variety of different agents, such as surfactants, co-solvents, buffers, biocides, sequestering agents, viscosity modifiers, and/or water. Latexes typically include water as the predominant liquid of the liquid vehicle.

The term "continuous" when referring to a latex particulate copolymer indicates that certain monomers used to form the copolymer are present substantially throughout the copolymerization process (and thus, are typically present substantially throughout the entire copolymer—or until a monomer is used up). In other words, in accordance with embodiments of the present invention, a "continuous copolymer" that includes at least one acidic monomer and at least one non-acidic monomer, for example, includes both monomers being copolymerized substantially throughout the polymerized latex particulate. However, the acidic monomer will be present at a low frequency at a first end of the polymer chain, and at a higher frequency at a second end of the polymer chain (up to and including 100% acidic monomer at the surface of the particulate formed by the polymerization process). Thus, though there can be a high frequency of acidic monomer copolymerized at a surface of the latex particulate, this is not considered to be a core/shell particulate, and thus, a core/shell particulate would not qualify as a "continuous copolymer" in the context of a latex particulate of the present invention. Further, when comparing latex particulate properties present at the surface compared to properties at the core, it is understood that the core can be considered on an average of that property at the core when appropriate.

"Colorant" can include a dye, a pigment, and/or another type of particulate that may be suspended in a liquid vehicle with the latex prepared in accordance with embodiments of the present invention. Dyes are typically water soluble, and therefore, can be desirable for use in many embodiments. However, pigments can also be used in other embodiments. Pigments that can be used include self-dispersed pigments and polymer dispersed pigments. Self-dispersed pigments included those that have been chemically surface modified with a charge or a polymeric grouping. This chemical modification aids the pigment in becoming and/or substantially remaining dispersed in a liquid vehicle. The pigment can also be a polymer-dispersed pigment that utilizes a dispersant (which can be a polymer or an oligomer or a surfactant) in the liquid vehicle and/or in the pigment that utilizes a physical coating to aid the pigment in becoming and/or substantially remaining dispersed in a liquid vehicle. With respect to the other particulates that can be used, examples include magnetic particles, aluminas, silicas, and/or other ceramics or organo-metallics, whether or not such particulates impart color.

The term "freqcel" denotes a reduction in ink drop ejection velocity with increased pen firing frequency. The lowering of drop velocity can be a problem as changes in the trajectory of the fired drops can reduce drop placement accuracy on the print media. Without being bound by one particular theory, freqcel may be attributable to thermal shear stripping of surfactant from latex particles near a pen firing chamber at the time of drop nucleation. Greater pen firing energy can be used to counteract the freqcel phenomenon.

The term "decel" denotes an increase in ink flow resistance within pen micro-channels, which in turn, reduces ejected drop volume. Such flow resistance can be caused by changes in ink rheology or plugged channels, and is often responsible for ink starvation within a pen firing chamber.

The term "decap" is a measure of how long a nozzle may remain inactive before plugging and how many pen firings are required to re-establish proper drop ejection.

The terms "surface dielectric constant" and "bulk dielectric constant" as well as the terms "bulk density" and "glass transition temperature" are interrelated and require a detailed explanation. Table 1 below provides, by way of example, certain values for homopolymers that can be used to predict bulk or surface dielectric constants, bulk densities, and glass transition temperatures of latex copolymeric particulates prepared in accordance with principles of the present invention. Such predictions can be made in accordance with accepted Bicerano correlations, as described in *Predictions of Polymer Properties*, Bicerano, Jozef, Marcel Dekker, Inc., New York, N.Y., 1996.

Concentrations, amounts, and other numerical data may be expressed or presented herein in a range format. It is to be understood that such a range 3 format is used for convenience and brevity, and thus, should be interpreted in a flexible manner to include not only the numerical values explicitly recited as the limits of the range, but also to include all the individual numerical values or sub-ranges encompassed within that range as if each numerical value and sub-range is explicitly recited. To illustrate, a concentration range of "0.1 wt % to 5 wt %" should be interpreted to include not only the explicitly recited concentration of 0.1 wt % to 5 wt %, but also include individual concentrations and the sub-ranges within the indicated range. Thus, included in this numerical range are individual concentrations, such as 1 wt %, 2 wt %, 3 wt %, and 4 wt %, and sub-ranges, such as from 0.1 wt % to 1.5 wt %, 1 wt % to 3 wt %, from 2 wt % to 4 wt %, from 3 wt % to 5 wt %, etc. This same principle applies to ranges reciting only one numerical value. For example, a range recited as "less than 5 wt %" should be interpreted to include all values and sub-ranges between 0 wt % and 5 wt %. Furthermore, such an interpretation should apply regardless of the breadth of the range or the characteristics being described.

With these definitions in mind, a latex suitable for ink-jet applications, e.g., thermal ink-jet applications, can comprise a liquid vehicle and a latex particulate dispersed therein. The latex particulate is not a core-shell particulate, and can be a continuous copolymer comprising at least one acidic monomer and at least one non-acidic monomer. The at least one acidic monomer is copolymerized throughout the latex particulate but is more concentrated at an outer surface of the particulate than at a core of the particulate. It is also noted that the latexes of the present invention can also be incorporated into ink-jet inks. Accordingly, the present invention provides ink-jet inks that can comprise an aqueous ink vehicle (which can be the liquid vehicle of the latex or can include other fluids added thereto), a colorant (pigment and/or dye), and latex particulate(s). It is noted that the colorant may be physically associated with the latex particulate or separate therefrom. For example, the colorant may be fully or partially encapsulated by the latex particulate. If encapsulated, such encapsulation restricts or minimizes separation of the colorant and latex particle upon printing, providing a more durable print film in some embodiments. In a capsule form, the latex particle may also be used to disperse the colorant within the ink vehicle. The function of the latex particle in capsule form can be same as with its pure latex (non-capsule) form. In each case, the polymer can fully or predominantly define the surface properties of the particle. Thus, reference to a colorant and latex particulate herein can include both combined (encapsulated) and separated forms. Likewise, any reference to a latex particulate without mention of a colorant can also include the colorant encapsulated form as well as the pure polymer latex form.

In another embodiment, a system for printing images can comprise an ink-jet ink including a liquid vehicle, a colorant, and a latex particulate being other than a core-shell particulate. The latex particulate can also be a continuous copolymer including at least one acidic monomer and at least one non-acidic monomer, wherein the at least one acidic monomer is copolymerized substantially throughout the latex particulate but is more concentrated at an outer surface of the particulate than at a core of the particulate. Further, the latex particulate can have a higher glass transition temperature at the surface than at the core. The system also includes an ink-jet architecture, e.g., thermal ink-jet architecture, loaded with the ink-jet ink.

In another embodiment, a method of making a latex can comprise copolymerizing at least one acidic monomer with at least one non-acidic monomer in a liquid to form latex particulates therein, wherein reaction conditions, monomer selection, relative amounts of monomers, and relative reactivities between monomers causes the at least one acidic monomer to be present throughout the particulate, with the proviso that upon formation of the latex, at least one acidic monomer is substantially more concentrated at a surface of the latex particulates than at a core of the latex particulates.

With respect to each of the above embodiments, in a more detailed aspect, the latex particulates can have a surface dielectric constant below about 2.9, about 2.8, or even below about 2.77. In another detailed aspect, the particulates can have a higher glass transition temperature at its surface than at its core. In still another aspect, the particulates can have a bulk density of from 1.00 g/cm$^3$ to 1.05 g/cm$^3$. In still another aspect, the particulates can be crosslinked with a crosslinking agent, e.g., the latex particulates can be crosslinked with a crosslinking agent being present in the copolymer at from 0.5 wt % to 5 wt %. Further, the latex particulates can also be configured to have a glass transition temperature of from 0° C. to 50° C. at their surfaces, and a lower glass transition temperature, e.g., sufficient to form a film at room temperature, at their cores.

Also with respect to each of the above embodiments, in addition to the required two monomers that are copolymerized in the latex particulates of the present invention, additional monomers can also be present, such as a second or third non-acidic monomer, or a second or third acidic monomer. Exemplary acidic monomers that can be used include acrylic acid, methacrylic acid, vinyl benzoic acid, methacryloyloxyethylsuccinate, and combinations thereof. Exemplary non-acidic monomers that can be used include styrene, butyl acrylate, methyl acrylate, hexyl acrylate, benzyl acrylate, 2-ethylhexyl acrylate, butyl methacrylate, 2-ethylhexyl methacrylate, hexyl methacrylate, hydroxyethyl methacrylate, octyl methacrylate, cyclohexyl methacrylate, derivative thereof and combinations thereof. Examples of derivatives include methyl styrene or the like. Other acidic and non-acidic monomers can also be used, the above lists being exemplary only.

In selecting monomers for inclusion in the latexes of the present invention, Table 1 is provided and includes information about certain homopolymers, monomers of which can be used to form the copolymeric continuous latex particulates in accordance with embodiments of the present invention. Additionally, it is noted that not all of the homopolymers listed in Table 1 are effective for use in making the latex particulates described herein. Table 1 is merely provided to describe what is meant by the terms "surface dielectric constant" or "bulk dielectric constant" as well as the terms "bulk density" and "glass transition temperature."

In the above Equations 1 and 2, $\in$ and $\rho$ are the latex bulk or surface dielectric constant and bulk density, respectively. The terms $E_{coh1}$, $N_{dc}$, $V_W$, W, and V are the molar fraction sum of the monomer cohesive energies, fitting parameters, van der Waals volumes, molecular weights, and molar volumes, respectively. The inverse latex glass transition temperature, $[1/T_g]_{copolymer}$, which is computed in Kelvin as provided in

TABLE 1

| | Homopolymer values | | | | | | | |
|---|---|---|---|---|---|---|---|---|
| Monomer | W | $E_{coh1}$ | $V_w$ | $N_{dc}$ | $\epsilon$ | V | $\rho$ | $T_g$ |
| n-octyl methacrylate | 198.31 | 69686 | 127.08 | 24 | 2.45 | 204.2 | 0.971 | −20 |
| Styrene | 104.15 | 39197 | 64.04 | 10 | 2.55 | 99.1 | 1.050 | 99.9 |
| cyclohexyl methacrylate | 168.24 | 59978 | 99.86 | 24 | 2.58 | 153.2 | 1.098 | 103.9 |
| 2-ethylbutyl methacrylate | — | 59130 | 107.28 | 24 | 2.68 | 163.7 | 1.040 | 11 |
| hexyl methacrylate | 170.23 | 59804 | 106.70 | 24 | 2.69 | 168.5 | 1.010 | −5.2 |
| isobutyl methacrylate | 142.20 | 48496 | 85.60 | 224 | 2.70 | 136.1 | 1.045 | 47.9 |
| t-butyl methacrylate | 142.20 | 46427 | 84.94 | 24 | 2.73 | 139.4 | 1.020 | 107 |
| sec-butyl methacrylate | 142.20 | 48872 | 86.92 | 24 | 2.75 | 135.2 | 1.052 | 57 |
| 2-ethylhexyl methacrylate | 198.31 | 77980 | 127.65 | 24 | 2.75 | 202.2 | 1.020 | 5.2 |
| n-butyl methacrylate | 142.20 | 49921 | 86.33 | 24 | 2.77 | 134.8 | 1.055 | 20 |
| n-butyl acrylate | 128.17 | 46502 | 76.82 | 24 | 2.87 | — | — | −54 |
| benzyl methacrylate | 176.22 | 64919 | 98.40 | 24 | 2.90 | 149.4 | 1.179 | — |
| hexyl acrylate | 156.23 | 65352 | 98.56 | 24 | 2.91 | 151.6 | 1.030 | −57.2 |
| ethyl methacrylate | 114.15 | 40039 | 65.96 | 24 | 3.00 | 102.0 | 1.119 | 50.9 |
| methyl methacrylate | 100.12 | 35097 | 54.27 | 24 | 3.10 | 85.6 | 1.170 | 104.9 |
| methyl acrylate | 86.09 | 31678 | 44.76 | 24 | 3.28 | 70.6 | 1.220 | 8 |
| ethylene glycol dimethacrylate | 198.22 | 88978 | 111.69 | 48 | 3.35 | 169.88 | 1.169 | — |
| methacrylic acid | 86.09 | 38748 | 45.99 | 24 | 3.52 | 70.6 | 1.219 | 187 |
| hydroxyethyl methacrylate | 130.14 | 66502 | 69.44 | 36 | 3.74 | — | — | 86 |
| methacryloyloxyethylsuccinate | 230.22 | 111243 | 116.06 | 72 | 3.84 | 177.4 | 1.298 | 58.3 |
| acrylic acid | 72.06 | 35329 | 36.48 | 24 | 3.90 | 53.5 | 1.347 | 106 |

In Table 1 above, the abbreviations used are defined as follows:
W Monomer molecular weight (grams/mole)
$E_{coh1}$ Cohesive energy (joules/mole)
$V_w$ Van der Waals volume (cm$^3$/mole)
$N_{dc}$ Fitting parameter (cm$^3$/mole)
$\epsilon$ Dielectric constant (no units)
V Molar volume (cm$^3$/mole)
$\rho$ Density (grams/cm$^3$)
$T_g$ Glass transition temperature (Celsius)

From these values, the bulk or surface dielectric constant, bulk density, and glass transition temperature of latex copolymers formed by copolymerization of any combination of these monomers (or other known monomers where these values are available) may be predicted using the following Bicerano correlations and glass transition temperature relationships:

$$\text{Dielectric constant}(\in) = 1.412014 + (0.001887 E_{coh1} + N_{dc})/V_W \quad \text{Equation 1}$$

$$\rho = W/V \quad \text{Equation 2}$$

$$[1/T_g]_{copolymer} = \Sigma(w/T_g)_n \quad \text{Equation 3}$$

Equation 3, is the sum (n) of the ratio of weight fraction to glass transition temperature of each monomer in the latex copolymer.

With respect to latex particulates that are polymerized or copolymerized to be roughly uniform throughout, the terms "bulk dielectric constant" and "surface dielectric constant" can be used interchangeably. For example, the bulk dielectric constant describes not only the core hydrophobicity, but also the surface hydrophobicity, as the core and the surface are, on average, of the same material.

The present inventions described above makes use of the recognitions that ink-jet inks based on conventional polymer particles show poor print performance and pen reliability under the elevated temperatures of a thermal ink-jet pen. A new understanding of these particles has revealed that this degradation is likely the result of a dramatic increase in inter-particle interaction above the polymer glass transition temperature. At temperatures above $T_g$, however increasing attraction between polymer particles, adversely affects ink viscosity, and degrades print performance. This insight is supported by the discovery of a correlation between latex-based ink print performance and modeled room temperature latex polymer dielectric constant. The present invention provides polymer sequences comprising monomer sets designed to minimize bulk density, as well as surface dielectric constant of latex particles and thereby reduce the effects of temperature on interparticle interaction.

The dependence of print performance and pen reliability on particle dielectric constant is unique to thermal inkjet and is contrary to conventional latex performance norms. While not being bound to one particular theory, it is believed here that dielectric constant determines the extent of increased inter-particle attractive energy that occurs above the particle glass transition temperature ($T_g$). Unlike classical latex polymer design, a thermal ink-jet particle is preferably functional at temperatures reaching 50° C. above its polymer glass transition temperature. Firing chamber temperatures can reach 60-70° C. during high drop frequency, blackout printing. The particle, on the other hand, requires a glass transition (softening) temperature near 20° C. to allow room temperature print-film formation.

Dielectric constant is a measure of the dipole density and polarizability of a polymer. Dielectric constant is classically measured through capacitance, where a layer of material is subjected to an orthoganol electric field by applying a voltage across sandwiching electrodes. The number and intensity of dipoles (dipole density) in the material and their ability to align with the field (polarizability) determines the material's dielectric constant.

Since polymers below their glass transition temperature typically have somewhat random dipole orientation and low dipole polarizability due to polymer folding and rotational hindrance in the solid, respectively, their dielectric constants are suppressed. However, at temperatures above the glass transition temperature, the mobility and polarizability of the polymer increases, allowing an increase in dielectric constant.

Figure 1:
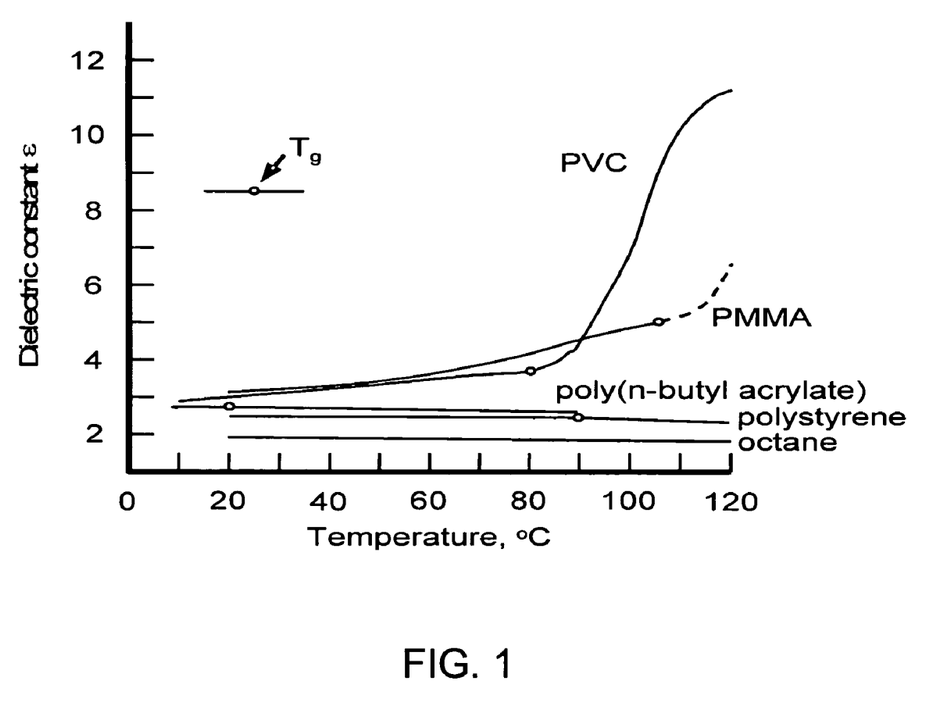
FIG. 1 shows the change in dielectric constant of two polar homopolymers and two non-polar homopolymers with changing temperature.

The dielectric constant of polar polymers increases with temperature (and dramatically so above the polymer glass transition temperature), as shown for polyvinyl chloride (PVC) in FIG. 1. As stated before, polar polymers include permanent dipoles that are somewhat randomly oriented in the particle solid due to the folding of the polymer chain. With temperature, the dipoles become more mobile and are more freely able to align and polarize the particle (higher polarizability), increasing the polymer dielectric constant. The degree of dipole mobility increases rapidly as the temperature exceeds the polymer glass transition temperature. The dielectric constant of PVC, for example, triples within a 40° C. span above its glass transition temperature, as shown in FIG. 1. The same behavior is expected for polymethyl methacrylate (PMMA), also shown in FIG. 1, as well as other highly polar acrylate and methacrylate polymers.

In stark contrast, the dielectric constant of non-polar polymers decreases with temperature and with virtually no inflection at the polymer glass transition temperature, as shown for polystyrene in FIG. 1. Non-polar polymers normally contain only carbon and hydrogen atoms and owe their low dielectric constant to weak instantaneous, non-permanent dipoles. The weak dipoles are virtually unaffected by temperatures of interest.

The divergent behavior of polar and non-polar polymers shown in FIG. 1 suggests that a blend of polar and non-polar constituents can produce a polymer having a stable dielectric constant with temperature. The print performance of various tested latexes suggests that the threshold occurs at a room temperature dielectric constant ($\in_{20C}$) of 2.75, since above this value particle print performance degrades unacceptably. This threshold dielectric constant corresponds very well with the approximate split point of polar and non-polar polymer behavior shown in FIG. 1. With respect to each of the above embodiments, the non-polar constituents can be low oxygen density non-acidic monomers while the polar constituents are higher oxygen density acidic monomers. Acidic monomers that satisfy this relationship are set forth above.

The acidic monomers are concentrated on the particle surface, and the acidic monomer concentration decreases toward the core. In a particular aspect, a radially-oriented gradient of acid monomer concentration can exist in the particle, with the lowest concentration being at the particle core and the highest being at the particle surface (up to 100%, depending in part of the other monomers and relative amounts present). In this way, the particle incorporates sufficient acidic monomer at the surface to provide for stabilization of particle charge, while maintaining a low surface dielectric constant to minimize interparticle interaction. In addition, since a significant portion of the particle's bulk comprises non-polar constituents, the dielectric constant will remain low in the elevated temperatures associated with thermal ink-jet printing. In another particular aspect, the surface dielectric constant of the particle is below about 2.9, about 2.8, or even below about 2.77. In a more particular aspect, the surface dielectric constant of the particle is 2.75 or less.

Given the marked change in dielectric constant behavior above $T_g$, the difference between the pen firing chamber temperature ($T_{pen}$) and $T_g$ can become a factor in thermal ink-jet performance. This is particularly so with regard to printing applications that require high nozzle firing frequency, such as area-fill printing. High firing frequency causes higher pen temperatures, which can result in increased particle aggregation and viscosity in inks based on particles with high dielectric constants. Therefore, it can be beneficial for a latex particulate to possess a higher $T_g$, so as to minimize the effects of high pen temperature on the particle's dielectric constant. On the other hand, a particle having a $T_g$ that is too high may not allow adequate print-film formation when printed onto a substrate at room temperatures. Accordingly, in a particular aspect of the present invention, the latex particulates possess a higher $T_g$ at the particle surface than at the particle core. In one embodiment, the surface $T_g$ can be from 30° C. to 50° C., while the polymer below the surface will have a lower $T_g$.

A higher surface $T_g$ can be achieved by incorporating acidic monomers whose homopolymers exhibit high $T_g$. It can be further accomplished by including one or more non-acidic monomers whose homopolymers exhibit high $T_g$, such as styrene. In certain embodiments of the invention, non-acidic monomers can also be present at the surface, as long as the glass transition temperature of the core is lower than the surface, and as long as the acidic monomer is more concentrated at the surface than at the core.

It is often desirable to stabilize the formed particle to withstand the high thermal shear conditions of the pen firing chamber without impacting the film-forming character of the particle. Otherwise, the polymer particle is prone to coalescence and precipitation in the high thermal shear nozzle and feed channel zones of the pen, eventually fouling the pen.

Such stabilization can be obtained through incorporation of from 0.5 wt % to 5 wt % addition of a multimer or crosslinking agent, such as a dimer, capable of forming crosslinks between polymer chains in the latex. In another embodiment, the multimer can be present at from 1 wt % to 2 wt %. Such a multimer can be represented by ethylene glycol dimethacrylate, though others can be used as would be known by those skilled in the art after considering the present disclosure. This narrow range of crosslinking has been found preferred in maintaining the integrity of the latex under the high thermal shear conditions of thermal ink-jetting, while not adversely impacting its room temperature film-forming properties.

Settling of latex particles can be avoided by designing polymers having a density matched to the vehicle. For nominally 200 nm particles, a polymer density .n the range $\rho=1.01$ to $1.05 \text{ g/cm}^3$ typically provides years-long room temperature dispersion stability. Fortuitously, polymers having low density also normally have low dielectric constant and solubility parameter. With respect to bulk density, an ink-jet compatible latex polymer in accordance with embodiments of the present invention can have a bulk density from $0.90 \text{ g/cm}^3$ to $1.10 \text{ g/cm}^3$. In another embodiment, the bulk density can be from $1.0 \text{ g/cm}^3$ to $1.05 \text{ g/cm}^3$, or even $1.02 \text{ g/cm}^3$ to $1.05 \text{ g/cm}^3$.

A copolymer sequence in which acidic constituents are concentrated at one end may be achieved by careful selection of the proper combination of acidic and nonacidic monomers to be copolymerized, as well as proper selection of relative amounts of each monomer for copolymerization along a chain length.

Of the potential monomer ordering schemes, an alternating acid/non-acid monomer sequence can be preferred on the latter acid end of the polymer. This allows for a high surface acid concentration with simultaneous dipole density dilution. It also allows most of the acid to be consumed in forming one end of the polymer chain, leaving the remaining length of chain mostly non-acid bearing. Thus, in one embodiment, a design starting point, then, is to select a co-reacting monomer that will form an alternating reaction sequence with the selected acid monomer while diluting its dipole density. The reactivity preference between monomers is can be considered to determining relative sequences. The relative rates of reactions (k) between two monomers is conventionally computed through Alfrey-Price reactivity ratios $r_1$ and $r_2$ as shown in Equations 4 and 5 below:

$$r_1 = k_{1,1}/k_{1,2} = (Q_1/Q_2)\exp[-e_1(e_1-e_2)] \qquad \text{Equation 4}$$

$$r_2 = k_{2,1}/k_{2,2} = (Q_2/Q_1)\exp[-e_2(e_2-e_1)] \qquad \text{Equation 5}$$

where the rate of reaction $k_{radical,monomer}$ for each combination of chain end free radical and unreacted monomer is computed and compared as ratios. As is known to those skilled in the art, the reactivity ratios of Equations 4 and 5 may be used to predict the mole fraction of monomers entering successive segments of a propagating polymer made of multiple monomers. For each segment, the reacting mole fraction varies depending on the instantaneous composition of monomers not yet reacted and their respective Q-e values.

TABLE 2

| Monomer | Q and e values | |
|---|---|---|
| | Q | e |
| acrylic acid | 0.83 | 0.88 |
| n-butyl acrylate | 0.38 | 0.85 |
| n-butyl methacrylate | 0.82 | 0.28 |

TABLE 2-continued

| Monomer | Q and e values | |
|---|---|---|
| | Q | e |
| ethyl acrylate | 0.41 | 0.55 |
| ethyl methacrylate | 0.76 | 0.17 |
| ethylhexyl methacrylate | 0.42 | 0.44 |
| hexyl acrylate | 0.38 | 0.61 |
| hexyl methacrylate | 0.35 | 0.42 |
| methacrylic acid | 0.98 | 0.62 |
| methyl acrylate | 0.45 | 0.64 |
| methyl methacrylate | 0.78 | 0.40 |
| p-methyl styrene | 1.10 | −0.63 |
| styrene | 1.00 | −0.80 |

The product of the reactivity ratios are provided as follows:

$$r_1 r_2 = \exp[-(e_1-e_2)^2] \qquad \text{Equation 6}$$

In a still more detailed embodiment, a second non-acidic monomer will have a lower $T_g$ and lower dipole density than either of the first two monomers. This allows the largest balancing impact for the least additive disruption to the alternating acidic-non-acidic monomer sequence. These qualities also promote the greatest ramp in acid from the first end of the chain to the second end, since the third co-reactant polymerizes primarily following the depletion of the acidic monomer.

By following this approach, regardless of the number of acidic and non-acidic monomers used, the resulting sequence will have most of the acid monomer concentrated at a second end of the polymer chain, with little acidic monomer at its first end. It is noted that though these polymers are referred to as having a first end and a second end, it is generally the case that the concentrations of the monomers are present in the monomer as a "ramp" where a monomer is present at low concentration at one end and ramps up to a higher concentration at another end, for example. In one embodiment, the acidic monomer generally gradually increases in concentration from a first end of the continuous polymer to a second end of the continuous polymer, e.g., the second end of the continuous polymer includes at least 10% more acidic monomer by weight than is present at the second end of the continuous polymer. Preferably, at least 20 mol % of the acidic monomer in the sequence will be present at the second end of the chain. In this example, the first end may little to no acidic monomer up to 10% less acidic monomer than is present at the surface. The sequence described here—one acidic monomer with one or two non-acidic monomers—is presented to explain the design rules to be employed in generating copolymers that will form particles according to the present invention. It will be apparent to those skilled in the art that this method can be employed with more than two or three monomers as described here.

The copolymers and resulting latex particulates of the present invention can be prepared through methods such as an emulsion or miniemulsion polymerization system, using commonly-used free-radical initiators. Such initiators include, but are not limited to, potassium persulfate, sodium persulfate, ammonium persulfate, hydrogen peroxide, 2,2'-azobis(2-methyl propinamideine)dihydrochloride, 4,4'-azobis(4-cyanovaleric acid) and salts thereof, and 1,1'-aobis(N, N'-dimethylformamide). The process can be carried out in batch, semi-batch, or continuous mode.

EXAMPLES

The following examples illustrate embodiments of the invention that are presently known. Thus, these examples should not be considered as limitations of the present invention, but are merely in place to teach how to make the best-known compositions of the present invention based upon current experimental data. As such, a representative number of compositions and their method of manufacture are disclosed herein.

Example 1

Preparation of Various Latexes

Nine latex copolymers were prepared using the same procedure and total weight percents of monomers and additives, the only difference being the individual monomers and weight percent for each monomer selected. The monomer content for each copolymer is set forth in Table 3 below:

TABLE 3

Monomer content for each of nine copolymers prepared

| Copolymer | MMA | Styrene | BMA | HMA | EHMA | HA | MES | MAA | EGDMA |
|---|---|---|---|---|---|---|---|---|---|
| 1 | 74 |  |  |  |  | 15 | 10 |  | 1 |
| 2 | 58 |  |  |  |  | 31 | 10 |  | 1 |
| 3 | 48 |  |  |  |  | 41 | 10 |  | 1 |
| 4 | 41 |  |  |  |  | 48 | 10 |  | 1 |
| 5 |  |  | 40 |  | 49 |  | 10 |  | 1 |
| 6 |  |  | 20 | 69 |  |  | 10 |  | 1 |
| 7 |  |  |  | 89 |  |  | 10 |  | 1 |
| 8 |  | 20 |  | 69 |  |  | 10 |  | 1 |
| 9 |  | 20 |  | 73 |  |  |  | 6 | 1 |

In Table 2 above, the abbreviations are defined as follows:
MMA methyl methacrylate
BMA butyl methacrylate
HMA hexyl methacrylate
EHMA 2-ethylhexyl methacrylate
HA hexyl acrylate
MES methacrylolyoxy ethyl succinate
MAA methacrylic acid
EGDMA ethylene glycol dimethacrylate Each latex was prepared according to the following procedure: A 200 gram monomer mix consisting of three or four monomers in weight percentages according to Table 3 was mixed into 70 ml of water. Each mixture was emulsified with RHODAFAC (alcohol ether phosphate esters) RS710 surfactant in 14.6 g of water. The RHODAFAC concentration for each copolymer preparation was varied from between 1.5 wt % to 2.5 wt % to maintain a collective particle size between 220 nm to 260 nm. A solution of 1 g potassium persulfate in 50 ml water was added dropwise over a period of 24 to a reactor containing 650 ml of 90° C. water. Three minutes into the persulfate addition, the emulsion was dropwise added to the reactor over a period of 20 minutes. The reaction was maintained at 90° C. for 1.5 hour, and then cooled to room temperature. Each of the resulting latex polymers were neutralized with potassium hydroxide solution to bring the pH of each latex solution to about 8.5. Each of the nine latex copolymers prepared were then filtered with a 200 mesh filter to particle sizes from about 220 to 260 nm.

Example 2

Performance of Latexes

The surface dielectric constant, bulk density, and glass transition temperature of latex copolymeric particulates of Example 1 can be ascertained, provided certain information is known about the monomers used in the latex particulate. Specifically, by using the relationships described in Equations 1-3 provided above, and the homopolymer values shown in Table 1, the nine latexes prepared in Example 1 were calculated to have the respective bulk or surface dielectric constants and bulk densities shown in Table 4 below. The glass transition temperatures for the latexes are also shown. The latexes were tested in identical ink systems and are ordered below based on the results with respect to freqcel, decel, and decap performance, as follows:

TABLE 4

Bulk density and surface dielectric constant, and glass transition temperature compared to printability

| Copolymer | Bulk Density (g/cm³) | Surface Dielectric Constant | Glass Transition Temp. (° C.) | Freqcel, Decel, and Decap |
|---|---|---|---|---|
| 1 | 1.16 | 3.12 | 81 | very poor |
| 2 | 1.13 | 3.09 | 43 | very poor |
| 3 | 1.12 | 3.07 | 21 | poor |
| 4 | 1.11 | 3.06 | 12 | poor |
| 5 | 1.04 | 2.86 | 13 | Fair |
| 6 | 1.04 | 2.81 | 7 | good |
| 7 | 1.04 | 2.80 | 0 | good |
| 8 | 1.04 | 2.77 | 16 | very good |
| 9 | 1.03 | 2.72 | 16 | very good |

With respect to the freqcel and printability (decel and decap) observations provided in Table 4, each of the latexes prepared in accordance with Example 1 were incorporated into a standardized ink formulation and print tested for freqcel, decel, and decap using a Hewlett-Packard thermal ink-jet pen. Latexes having a dielectric constant above 3.0 failed to print above 8 kHz drop frequency and showed poor printability as measured by decel and decap metrics. The severity of freqcel, decel, and decap problems increased proportionately as the latex dielectric constant was increased. The latex having the highest dielectric constant (3.12) failed to print at 3 kHz. Latexes having dielectric constant below 3.0 showed significant improvement in freqcel, decel and decap, with improvement appearing to be inversely proportional to latex dielectric constant. Those latexes having dielectric constant below 2.8 had an even better freqcel, decel and decap performance.

Example 3

Figure 2:
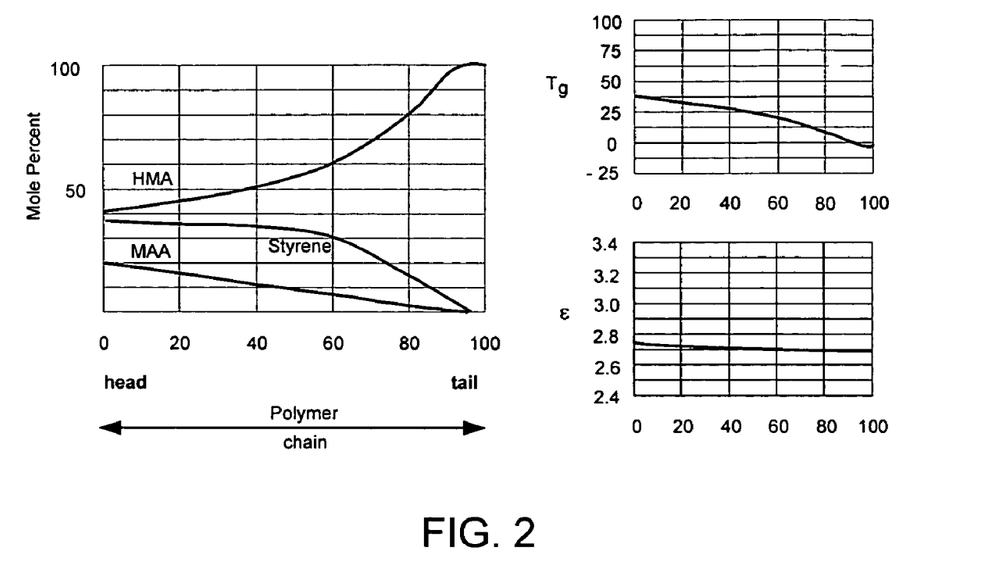
FIG. 2 shows relationships for an acceptable sequence of a copolymer of methacrylic acid, hexyl methacrylate, and styrene, in which mole percentages of each constituent as well as glass transition temperature and dielectric constant are plotted against polymer chain position on a continuous latex particulate copolymer.

Head-to-Tail Monomer Sequence of a Representative Copolymer in Accordance with Embodiments of the Present Invention The sequence of the Copolymer 9 shown in Tables 3 and 4 above was analyzed by a sequence-predictive computer algorithm. The mole percentage of each constituent monomer was plotted against polymer chain position. As is shown in FIG. 2, the predicted monomer sequence of this copolymer had a definitive acid ramp, placing 20 mole percent methacrylic acid at the polymer second end and about zero acid at the first (starting) end of the polymer. The high dipole density of the acid was diluted by the co-reacting styrene and hexyl methacrylate monomers such that the surface dielectric constant of the particle fell under the proposed upper limit of non-polar polymer temperature-dependent behavior ($\epsilon_{20C}$=2.75) as is shown in Tables 3 and 4.

This copolymer incorporates two low solubility parameter monomers, styrene and hexyl methacrylate, to offset the high solubility parameter acid at the surface. The lowest solubility parameter monomer of the two, hexyl methacrylate, adds statistically to the second end of the composition by its high concentration in the overall monomer mix (73% by wt.). The high presence of hexyl methacrylate along the length of the polymer chain, assures that the overall polymer has a solubility parameter below that of many vehicle solvents (<20 Mpa$^{1/2}$).

The presence of styrene and the methacrylic acid head-to-tail ramp, naturally creates a polymer having a ramped glass transition temperature.

Example 4

Head-to-Tail Monomer Sequence of Representative Unacceptable Copolymer

Figure 3:
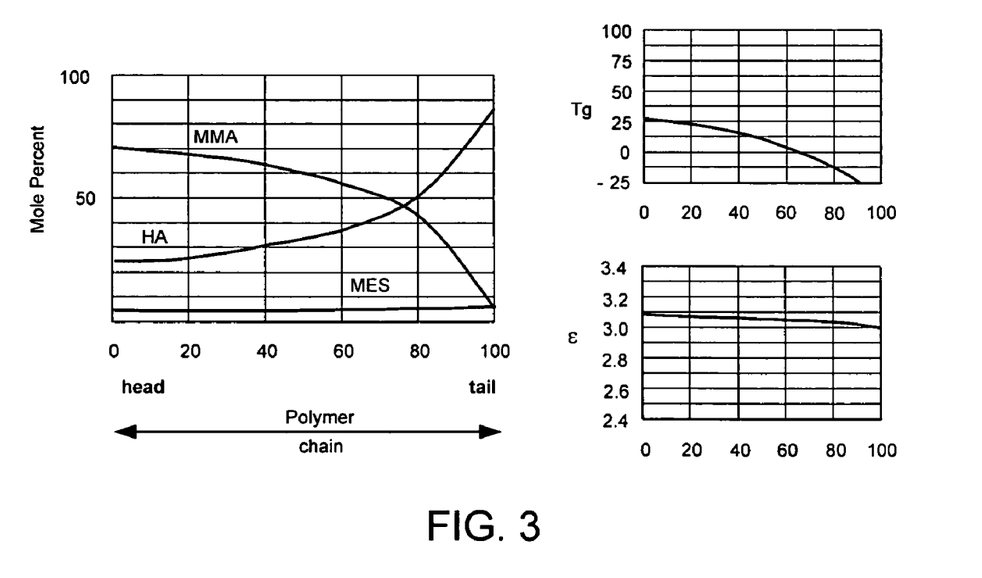
FIG. 3 shows relationships for an unacceptable sequence of a copolymer of methyl methacrylate, hexyl acrylate, and methacrylolyoxy ethyl succinate, in which mole percentages of each constituent as well as glass transition temperature and dielectric constant are plotted against polymer chain position on a continuous latex particulate copolymer.

For comparative purposes, the sequence of Copolymer 4 shown in Tables 3 and 4 above was analyzed by a sequence-predictive computer algorithm. The mole percentage of each constituent monomer was plotted against polymer chain position. As is shown in FIG. 3, the predicted monomer sequence of this copolymer lacked a definitive acid ramp, and as can be seen from Table 4, this latex performed poorly compared to Copolymers 5-9. Thus, even though this polymer includes both acidic monomers and non-acidic monomers, this latex particulate does not form in a manner where the acidic monomer becomes concentrated at the surface of the latex particulate, and thus, is not considered to be within the context of the present invention.

While the forgoing examples are illustrative of the principles of the present invention in one or more particular applications, it will be apparent to those of ordinary skill in the art that numerous modifications in form, usage and details of implementation can be made without the exercise of inventive faculty, and without departing from the principles and concepts of the invention. Accordingly, it is not intended that the invention be limited, except as by the claims set forth below.

What is claimed is:

1. A latex formulated for ink-jet applications, comprising a liquid vehicle and a latex particulate dispersed therein, said latex particulate being other than a core-shell particulate, and said latex particulate also being a continuous copolymer including at least one acidic monomer and at least one non-acidic monomer, wherein the at least one acidic monomer is copolymerized throughout the latex particulate but is more concentrated at an outer surface of the particulate than at a core of the particulate and wherein the latex particulate has a calculated surface dielectric constant of 2.9 or less at room temperature.

2. The latex of claim 1, wherein the copolymer further includes a second non-acidic monomer.

3. The latex of claim 2, wherein the second non-acidic monomer is selected from the group of styrene, butyl acrylate, methyl acrylate, hexyl acrylate, benzyl acrylate, 2-ethylhexyl acrylate, butyl methacrylate, 2-ethylhexyl methacrylate, hexyl methacrylate, hydroxyethyl methacrylate, octyl methacrylate, and cyclohexyl methacrylate.

4. The latex of claim 3, wherein the second non-acidic monomer is hexyl methacrylate.

5. The latex of claim 1, wherein the at least one acidic monomer is selected from the group of acrylic acid, methacrylic acid, vinyl benzoic acid, and methacryloyloxyethylsuccinate.

6. The latex of claim 5, wherein the at least one acidic monomer is methacrylic acid.

7. The latex of claim 1, wherein the at least one non-acidic monomer is selected from the group of styrene, butyl acrylate, methyl acrylate, hexyl acrylate, benzyl acrylate, 2-ethylhexyl acrylate, butyl methacrylate, 2-ethylhexyl methacrylate, hexyl methacrylate, hydroxyethyl methacrylate, octyl methacrylate, cyclohexyl methacrylate, derivatives and combinations thereof.

8. The latex of claim 7, wherein the at least one non-acidic monomer is styrene or a derivative thereof.

9. The latex of claim 1, wherein the calculated surface dielectric constant is 2.77 or less at room temperature.

10. The latex of claim 1, wherein the latex particulate has a bulk density of from 0.90 g/cm$^3$ to 1.10 g/cm$^3$.

11. The latex of claim 1, wherein the latex particulate has an average glass transition temperature of from 0° C. to 50° C. at its surface.

12. The latex of claim 1, wherein the latex particulate is crosslinked with a crossliniking agent being present in the copolymer at from 0.5 wt % to 5 wt %.

13. The latex of claim 1, formulated as an ink-jet ink including a colorant dispersed or dissolved in the liquid vehicle.

14. The latex of claim 13, wherein the colorant is a pigment, and wherein the ink-jet ink further includes a dispersing agent.

15. The latex of claim 13, wherein the colorant is a self dispersed pigment.

16. The latex of claim 13, wherein the colorant is a dye.

17. The latex of claim 13, wherein the colorant is a pigment and the latex particulate at least partially encapsulates the pigment.

18. The latex of claim 1, wherein the latex particulate has a higher glass transition temperature on average at its surface than at its core.

19. The latex of claim 1, wherein a second end of the continuous polymer includes at least 10% more acidic monomer by weight than is present at a first end of the continuous polymer.

20. The latex of claim 1, wherein the ink-jet applications are thermal ink-jet applications, and wherein the latex is suitable for use in a thermal ink-jet architecture.

21. A system for printing images, comprising:
an ink-jet ink, comprising a liquid vehicle, a colorant, and a latex particulate being other than a core-shell particulate, said latex particulate also being a continuous copolymer including at least one acidic monomer and at least one non-acidic monomer, wherein the at least one acidic monomer is copolymerized throughout the latex particulate but is more concentrated at an outer surface of the particulate than at a core of the particulate, and wherein the latex particulate has a calculated surface dielectric constant of 2.9 or less at room temperature; and
an ink-jet architecture loaded with the ink-jet ink.

22. The system of claim 6, wherein the copolymer further includes a second non-acidic monomer.

23. The system of claim 22, wherein the second non-acidic monomer is selected from the group of styrene, butyl acrylate, methyl acrylate, hexyl acrylate, benzyl acrylate, 2-ethylhexyl acrylate, butyl methacrylate, 2-ethylhexyl methacrylate, hexyl methacrylate, hydroxyethyl methacrylate, octyl methacrylate, and cyclohexyl methacrylate.

24. The system of claim 21, wherein the at least one acidic monomer is selected from the group of acrylic acid, methacrylic acid, vinyl benzoic acid, and methacryloyloxyethylsuccinate.

25. The system of claim 21, wherein the at least one non-acidic monomer is selected from the group of styrene, butyl acrylate, methyl acrylate, hexyl acrylate, benzyl acrylate, 2-ethylhexyl acrylate, butyl methacrylate, 2-ethylhexyl methacrylate, hexyl methacrylate, hydroxyethyl methacrylate, octyl methacrylate, cyclohexyl methacrylate, and combinations thereof.

26. The system of claim 21, and wherein the latex particulate has a bulk density of from 0.90 g/cm$^3$ to 1.10 g/cm$^3$.

27. The system of claim 21, wherein the latex particulate has a glass transition temperature of from 0° C. to 50° C. at its surface, and wherein the maximum temperature exerted on the thermal ink-jet ink during area-fill printing is 80° C.

28. The system of claim 21, wherein the latex particulate is crosslinked with a crosslinking agent being present in the copolymer at from 0.5 wt % to 5 wt %.

29. The system of claim 21, wherein the ink-jet architecture is thermal ink-jet architecture and the ink-jet ink is thermal ink-jet ink.

30. The system of claim 29, said thermal ink-jet architecture exerting a maximum temperature on the thermal ink-jet ink during a time period exposed to that maximum temperature while area-fill printing which is insufficient to cause dipoles at the surface of the latex particulates to transition from a predominantly random and fixed orientation to a more oriented and rotationally free configuration.

31. A method of making a latex, comprising copolymerizing at least one acidic monomer with at least one non-acidic monomer in a liquid to form latex particulates wherein said latex particulates being other than a core-shell particulates, and said latex particulates also being a continuous copolymer, wherein the at least one acid monomer is copolymerized throughout the latex particulates but is more concentrated at an outer surface of the particulates than at a core of the particulates and wherein the latex particulates have a calculated surface dielectric constant of 2.9 or less at room temperature.

32. The method of claim 31, wherein the step of copolymerizing further includes copolymerizing a second non-acidic monomer therewith.

33. The method of claim 32, wherein the second non-acidic monomer is selected from the group of styrene, butyl acrylate, methyl acrylate, hexyl acrylate, benzyl acrylate, 2-ethylhexyl acrylate, butyl methacrylate, 2-ethylhexyl methacrylate, hexyl methacrylate, hydroxyethyl methacrylate, octyl methacrylate, and cyclohexyl methacrylate.

34. The method of claim 31, wherein the at least one acidic monomer is selected from the group of acrylic acid, methacrylic acid, vinyl benzoic acid, and methacryloyloxyethylsuccinate.

35. The method of claim 34, wherein the at least one acidic monomer is methacrylic acid.

36. The method of claim 31, wherein the at least one non-acidic monomer is selected from the group of styrene, butyl acrylate, methyl acrylate, hexyl acrylate, benzyl acrylate, 2-ethylhexyl acrylate, butyl methacrylate, 2-ethylhexyl methacrylate, hexyl methacrylate, hydroxyethyl methacrylate, octyl methacrylate, cyclohexyl methacrylate, and combinations thereof.

37. The method of claim 36, wherein the at least one non-acidic monomer is styrene.

38. The method of claim 31, wherein the latex particulates have wherein the latex particulates have a bulk density of from 0.90 g/cm$^3$ to 1.10 gm/cm$^3$.

39. The method of claim 31, wherein the latex particulates have a glass transition temperature of from 0° C. to 50° C. at their surface.

40. The method of claim 31, wherein the latex particulates are crossliniked with a crossliniking agent being present in the copolymer at from 0.5 wt % to 5 wt %.

41. The method of claim 31, further comprising the step of formulating the latex with a colorant to form a latex-containing thermal ink-jet ink.

42. The method of claim 41, wherein the colorant is a pigment.

43. The method of claim 41, wherein the colorant is a dye.

* * * * *

UNITED STATES PATENT AND TRADEMARK OFFICE
CERTIFICATE OF CORRECTION

PATENT NO. : 7,705,070 B2  
APPLICATION NO. : 11/486488  
DATED : April 27, 2010  
INVENTOR(S) : Kent D. Vincent et al.

Page 1 of 1

It is certified that error appears in the above-identified patent and that said Letters Patent is hereby corrected as shown below:

In column 14, line 54, in Claim 12, delete "crossliniking" and insert -- crosslinking --, therefor.

In column 14, lines 62-63, in Claim 15, delete "self dispersed" and insert -- self-dispersed --, therefor.

In column 15, line 24, in Claim 22, delete "claim 6," and insert -- claim 21, --, therefor.

In column 15, line 50, in Claim 28, delete "crossliniking" and insert -- crosslinking --, therefor.

In column 16, lines 41-42, in Claim 38, after "wherein the latex particulates have" delete "wherein the latex particulates have".

In column 16, line 48, in Claim 40, delete "crossliniked" and insert -- crosslinked --, therefor.

In column 16, line 48, in Claim 40, delete "crossliniking" and insert -- crosslinking --, therefor.

Signed and Sealed this  
Twelfth Day of April, 2011

David J. Kappos  
*Director of the United States Patent and Trademark Office*